United States Patent
Singla et al.

(10) Patent No.: US 7,546,458 B1
(45) Date of Patent: Jun. 9, 2009

(54) METHOD FOR ORGANIZING VIRTUAL NETWORKS WHILE OPTIMIZING SECURITY

(75) Inventors: Aman Singla, Fremont, CA (US); Andrew M. Davidson, San Jose, CA (US); Michael Fine, San Francisco, CA (US); Kevin Hayes, Mountain View, CA (US)

(73) Assignee: Atheros Communications, Inc., Santa Clara, CA (US)

( * ) Notice: Subject to any disclaimer, the term of this patent is extended or adjusted under 35 U.S.C. 154(b) by 1613 days.

(21) Appl. No.: 10/273,497

(22) Filed: Oct. 18, 2002

Related U.S. Application Data

(60) Provisional application No. 60/377,906, filed on May 4, 2002.

(51) Int. Cl.
   *H04L 9/00*      (2006.01)
   *H04K 1/00*      (2006.01)
   *G06F 15/173*    (2006.01)
(52) U.S. Cl. .................. 713/166; 380/255; 709/223
(58) Field of Classification Search ............... 713/166; 709/223; 380/255
   See application file for complete search history.

(56) References Cited

U.S. PATENT DOCUMENTS

| | | | | |
|---|---|---|---|---|
| 5,684,800 A | | 11/1997 | Dobbins et al. | |
| 5,978,378 A | * | 11/1999 | Van Seters et al. | 370/401 |
| 5,983,350 A | * | 11/1999 | Minear et al. | 726/11 |
| 6,304,973 B1 | * | 10/2001 | Williams | 726/3 |
| 6,308,218 B1 | * | 10/2001 | Vasa | 709/238 |
| 6,804,656 B1 | * | 10/2004 | Rosenfeld et al. | 705/3 |
| 2002/0146002 A1 | * | 10/2002 | Sato | 370/386 |
| 2002/0146026 A1 | * | 10/2002 | Unitt et al. | 370/428 |
| 2003/0120763 A1 | * | 6/2003 | Volpano | 709/223 |
| 2003/0145118 A1 | * | 7/2003 | Volpano et al. | 709/249 |
| 2005/0157688 A1 | * | 7/2005 | Rydnell et al. | 370/338 |

OTHER PUBLICATIONS

IBM technical Disclosure Bulletin, Mar. 2002, "Use of Virtual Local Area Networks in a Shared Infrastructure to Support Multiple Customers at Low Cost," Mar. 1, 2002, pp. 1-3.*

* cited by examiner

*Primary Examiner*—Emmanuel L Moise
*Assistant Examiner*—Michael Pyzocha
(74) *Attorney, Agent, or Firm*—Bever, Hoffman & Harms, LLP; Jeanette S. Harms

(57) ABSTRACT

An access point in a wireless communication system can be configured to include multiple virtual LANS (VLANs) based on security levels, thereby allowing secure traffic to be isolated from insecure traffic. Configuring the access point can include assigning a security level to each VLAN and setting a security association for each station associated with the access point. Based on this security association, each station can be assigned to an appropriate VLAN.

17 Claims, 3 Drawing Sheets

METHOD FOR ORGANIZING VIRTUAL NETWORKS WHILE OPTIMIZING SECURITY

RELATED APPLICATIONS

This application claims priority to U.S. Provisional Application Ser. No. 60/377,906 which was filed on May 4, 2002.

BACKGROUND OF THE INVENTION

1. Field of the Invention

The present invention relates generally to the field of wirelessly connected computer networks and particularly the assignment of networked computers to sub-networks based on the security level of the connection enabled by each networked computer.

2. Description of the Related Art

Current technology has allowed the global expansion of proprietary networks, thereby creating the potential for a dispersed workforce. To efficiently incorporate individuals from different physical locations into coordinated workgroups, specialized sub-networks, called Virtual Local Area Networks (VLANs), can be used. VLANs are logically, rather than physically, defined sub-networks. VLANs, which can include any type of data traffic creators (e.g. portable and desktop computers, servers, printers, or other peripherals) can be defined according to various policies or selection parameters.

In one embodiment, VLAN technology allows a system administrator to group ports of various switches and the users associated with such ports into defined communities. For example, FIG. 1 illustrates three logically defined sub-networks, i.e. VLANs 101, 102, and 103. The computer icons, shown in VLANs 101, 102, and 103, represent users within those sub-networks. In this embodiment, the network includes two switches 104 and 105, each switch having eight ports (shown as circles). VLAN 101 comprises four ports of switch 104 and three ports of switch 105; VLAN 102 comprises two ports of switch 104 and five ports of switch 105; and VLAN 103 comprises two ports of switch 104 and zero ports of switch 105. In this network configuration, each VLAN allows communication between its own users (i.e. as if the users were on a common LAN), but restricts communication between users of different VLANs. VLANs 101, 102, and 103 could represent various groups within a company, such as engineering, sales, and accounting. When a user moves from one port to another, the system administrator can reconfigure the VLAN membership to include that user.

In another embodiment, VLAN membership can be based on a MAC-layer address. In a MAC address-based VLAN, users can be initially configured to be in at least one VLAN, thereby allowing the subsequent tracking of such users. When the user changes location, the VLAN configuration may change, or remain constant, the VLAN configuration may change based on the MAC-layer address. U.S. Pat. No. 5,684,800 provides an illustrative explanation of the operation and configuration of MAC address-based VLANs and is incorporated by reference herein.

Advantageously, VLANs are supported over all IEEE 802 LAN MAC protocols. Moreover, VLANs can provide 1:N communication (i.e. shared media traffic) as well as 1:1 communication (i.e. point-to-point traffic). Additional advantages of VLANs, as well as the standardized format for frame tagging of VLANs, are provided in the IEEE 802.1Q standard published in 1999.

Increasingly, users want to encrypt their communications, especially in wireless environments, which are particularly susceptible to interception. The 1999 IEEE 802.11 standard includes encryption as a service. However, this encryption methodology provides only low-level security. Therefore, a need arises for implementing higher-level security encryption methodologies into VLANs.

SUMMARY OF THE INVENTION

In accordance with one feature of the invention, an access device in a wireless communication system can be configured to include multiple virtual LANS (VLANs) based on security levels, thereby allowing secure traffic to be isolated from insecure traffic. Configuring the access device can include assigning a security level to each VLAN and setting a security association for each station associated with the access device. The security association can include security algorithms (i.e. a cipher suite), end point designations, key length (wherein a key is a given length of random data), predetermined key rotations, and/or liveness. Each station can be assigned to an appropriate VLAN based on its security association.

In one embodiment, setting security associations, e.g. key maps, for the stations can be triggered by an access control enable command. This command can further indicate whether unencrypted traffic from a transmitting station should be filtered, i.e. not forward to the receiving station.

A VLAN identification (VID) identifies each VLAN. In one embodiment, the VID could be incorporated into the transmitting data frame. Additionally, certain functions on the access device, such as configuration and management functions, can be designated to be accessible via a particular VLAN during the assignment step. In accordance with one aspect of the invention, a new security level can be assigned to any VLAN. In one embodiment, a default VLAN can be provided.

A wireless communication system can include an access point and a plurality of stations associated with the access point, each station being assigned to a VLAN based on its security association. Various security levels can be used in accordance with the invention. For example, current encryption standards include AES, WEP and/or no encryption. Other embodiments of the invention can provide VLANs with different encryption standards.

DETAILED DESCRIPTION OF THE FIGURES

In accordance with one feature of the invention, a wireless access point (AP) platform can support multiple VLANs based on the level of security provided. Specifically, VLAN membership of a wireless station to a particular VLAN is based on the security association that the station uses over the wireless link. For example, using security VLANs, an AP could place more secure wireless stations directly onto a sensitive internal corporate sub-network, whereas less secure wireless stations could be assigned to a VLAN that functions outside the corporate sub-network's firewall. In this manner, the corporate network can be kept completely secure while still providing the benefits of wireless connectivity to all users within physical proximity of the AP.

Various levels of encryption currently can be used in accordance with security VLANs. For example, the Advanced Encryption Standard (AES) specifies a cryptographic algorithm that can provide a 128-, 192-, or 256-bit key. In general, the larger the key size, the greater the level of security provided. Another encryption standard, called the Wired Equivalent Protocol (WEP), can provide a 64-, 128-, or 152-bit key. However, each WEP key includes 24 bits that are not user-controlled. Thus, to more accurately compare WEP to AES, the WEP key can be thought of as including 40, 104, or 128 bits. Therefore, for purposes of description herein, AES and WEP will be used as exemplary encryption standards representing "high" and "low" security levels, respectively. In accordance with other embodiments of the invention, different encryption standards offering different levels of security can also be used.

Figure 1:
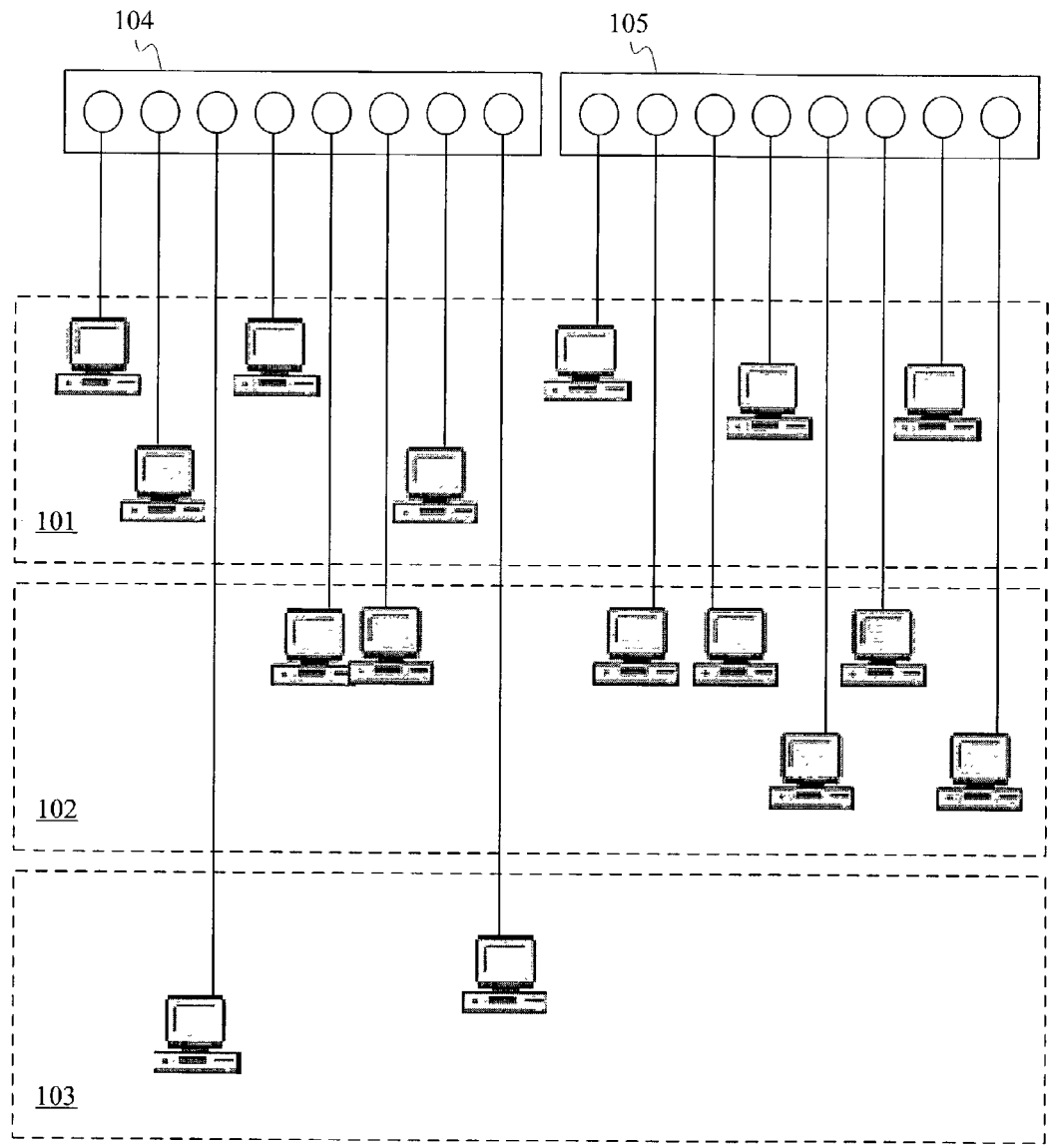
FIG. 1 illustrates three logically defined sub-networks.
Figure 2:
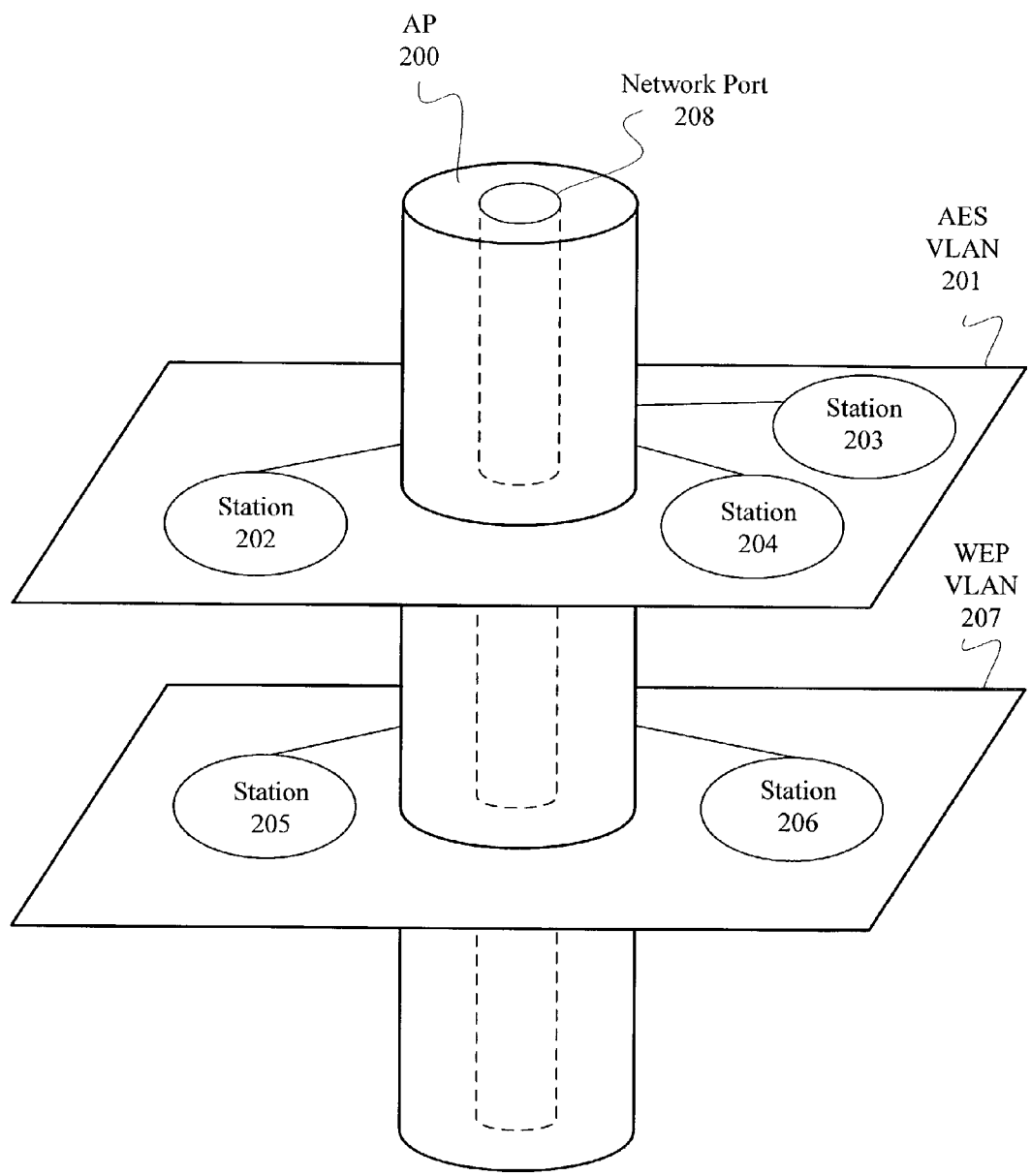
FIG. 2 illustrates an access point (AP) with multiple VLANS, wherein each VLAN has an associated security level.

FIG. 2 illustrates an AP 200 having an AES VLAN 201 and a WEP VLAN 207. In this embodiment, AES VLAN 201 includes stations 202, 203, and 204, whereas WEP VLAN 207 includes stations 205 and 206. In accordance with one feature of the invention, frames from one station can be forwarded to other stations within the group of wireless devices associated with AP 200, called a Basic Service Set (BSS), only if the other stations are in the same VLAN. Thus, stations 202, 203, and 204 can communicate with each other through AP 200. Similarly, stations 205 and 206 can communicate through AP 200. However, if the stations are in different VLANs, then AP 200 filters the frame, i.e. does not allow the frame to be transmitted. Thus, for example, if station 205 attempts to send a frame using WEP to station 203, which communicates using AES, then AP 200 would filter that frame.

In one embodiment, a VLAN Identifier (VID) facilitates identification of that VLAN. Specifically, a VID can be included in a VLAN tag, which in turn can be incorporated into a transmitting data frame. In this manner, each frame indicates its level of encryption security. In one embodiment, a VLAN can allow multiple or even all security levels (and thus, the associated VLAN tag would indicate all levels of encryption security in which the station can communicate). For example, a station could have the capability to communicate in a VLAN using both AES and/or WEP. Or a station could have the capability to communicate in a VLAN using AES and/or no encryption security.

In one embodiment, a configured AP can determine the security association of a station using the VID in the frame and a look-up table of VIDs and security associations. Knowing the VID and/or the security association allows the AP to change the VLAN of a station should the need arise or to match the security level of the transmitting station with the security level of the VLAN.

In one embodiment, frames received at a network port 208, e.g. an Ethernet port, using a VLAN tag with no corresponding VID can be filtered. In another embodiment, the VLAN tag corresponding to a designated encryption standard can be set to "invalid," thereby causing all frames using that designated encryption standard to be filtered.

In one embodiment, the VLANs can be implemented via software, which is executed by a microprocessor or central processing unit (CPU) within the AP. To correctly configure a VLAN operation, the network port of the AP needs to be connected to devices that can understand VLAN tags, e.g. an IEEE 802.1Q-compliant device. These devices can include bridges, routers, or hosts. Multiple VLANs can be aggregated onto the network port (also called a trunk port), thereby effectively combining the traffic load of the stations.

Figure 3:
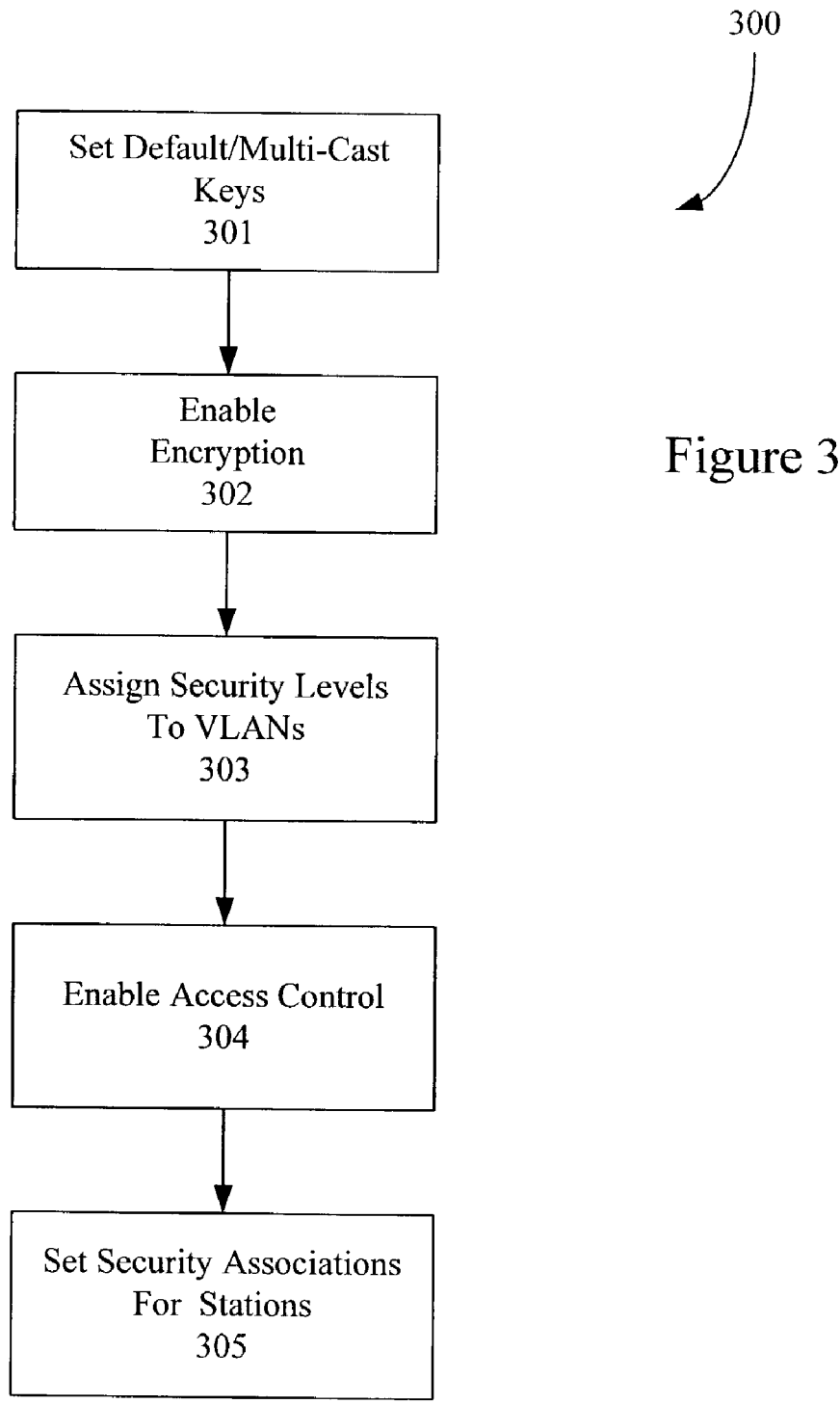
FIG. 3 illustrates a flow chart with exemplary steps for configuring an AP to include multiple VLANs based on security levels.

FIG. 3 illustrates a flow chart 300 with exemplary steps for configuring an AP to include multiple VLANs based on security levels. Flow chart 300 is herein described in conjunction with pseudo code (immediately following) that can implement this configuration. Note that a code line starting with a # is a comment line, whereas a code line without a # is a command.

In this example, the AP is connected to a switch via a trunk port.

On the switch, the vlan is the default (1).

VLAN 16 is set up, and connected to the internal network. [10.10.16.X]

VLAN 2 is set up, and connected to the external network. [192.168.1.X]

VLAN 3 is set up, and connected to another external network. [192.168.2.X]

set your default key your WEP and AES clients must have this as their Shared Key #1 set key 1 40 1234567890 set key 1 default set your default AES-VLAN key your AES clients must have this as their Shared Key #2 set key 2 128 1234567890abcdef1234567890abcdef set key 2 default AES-VLAN allow encryption set encryption enable set your cipher to allow both WEP and AES set cipher auto

VLANs are set in decimal numbers.

set vlan eth 1 set vlan ap 16 set vlan aes 16 set vlan wep 2 set vlan clear 3 set acl control mode if you "set acl strict", then clear clients will be dropped set acl enable set your unique station keys set acl keymap 00:03:7 F:00:00:01 104 1234567890abcdef1234567890 set acl keymap 00:03:7 F:00:00:02 128 1234567890abcdef1234567890abcdef

As indicated in the initial comment lines of the pseudo code, the AP can be connected to a switch via a trunk port. In this particular switch, the default setting is a VLAN. In this embodiment, three VLANs will be configured. To facilitate this configuration, each VLAN is assigned an arbitrary number, i.e. VLAN 16, VLAN 2, or VLAN 3. Each of these VLANs will be associated with a specific network. For example, VLAN 16 will be associated with an internal network, which has a designated number 10.10.16.X. Similarly, VLAN 2 will be associated with an external network, which has a designated number 192.168.1.X, and VLAN 3 will be associated with another external network, which has a designated number 192.168.2.X. As explained in further detail below, VLANs 16, 2, and 3 will be associated with AES, WEP, and Clear (i.e. unencrypted) security levels, respectively.

The "set key 1" commands set a default encryption key (step 301), which can be used by both the WEP and AES clients. Note that a default key can be considered a multi-cast key in the context of the security VLANs. If WEP and AES are assigned to separate VLANs, as shown in this embodiment, an additional default key can be set for the AES VLAN. In this embodiment, an additional default key can be programmed for AES by appending "AES-VLAN" to the end of the default command (i.e. "set key 2 default AES-VLAN"). Note that AES encryption uses longer keys than WEP encryption, e.g. 128 versus 40 bits, as previously described.

At this point, encryption can be enabled in step 302 as triggered by the "set encryption enable" command. The "set cipher auto" command allows the AP to automatically negotiate the appropriate security association with each station based on that station's capability. The security levels and associated VIDs for the VLANs can be assigned in step 303. For example, the "set vlan aes 16" command indicates that the AES traffic corresponds to VLAN 16; the "set vlan wep 2" command indicates that WEP traffic corresponds to VLAN 2; and the "set vlan clear 3" command indicates that unencrypted traffic corresponds to VLAN 3.

Additionally, the "set vlan ap 16" command indicates that to access the configuration and management functions on the AP, the AP is also placed on VLAN 16. This command allows a system administrator to change settings on the AP. Preferably, the AP node is placed on the most secure VLAN to provide optimal security. Finally, the "set vlan eth 1" command indicates that for any untagged traffic received on the Ethernet port of the AP, that traffic is assumed to have tag "1". As this number does not correspond to any VID, a tag 1 essentially filters out that traffic.

The "set acl enable" command allows the AP to enable access control in step 304. This access control can include setting security associations in step 305 for stations assigned to VLANs 2, 3, and 16. In one embodiment, setting a security association could include setting a key map for each station. Exemplary "set acl keymap" commands from two stations are provided to the AP in this case.

In one embodiment, if no VLANs are explicitly created by a system administrator during the initial AP configuration (step 303), then the VLAN assignment of each security level can be automatically determined by the setting of the encryption mode. For example, in one default configuration after enabling encryption (step 302), the WEP and AES security levels can be assigned to VLAN 1 and the Clear security level can be assigned to VLAN 0xff, i.e. an invalid VLAN. Note that if encryption is not enabled, then the WEP and AES security levels can be assigned to VLAN 0xff and the Clear security level can be assigned to VLAN 1. To provide optimal system flexibility, these default settings can be changed with the "set VLAN" commands (step 303).

Examples of additional VLAN configuration commands following the initial AP configuration are provided below in pseudo code. Note that commands are preceded with arrows, whereas system (i.e. AP) responses have no arrows. In this case, no VLANs have been created during the initial AP configuration.

-> get encryption

Encryption: Enabled

-> get vlan

Ethernet Port Native Vlan: 1

AP's local Vlan: 1

AES Vlan: 1

WEP Vlan: 1

Clear Vlan: INVALID (traffic will be filtered)

-> set vlan aes 3

-> set vlan clear 2

-> set vlan wep 1

-> set vlan eth 3

-> set vlan ap 3

-> get vlan

Ethernet Port Native Vlan: 3

AP's local Vlan: 3

AES Vlan: 3

WEP Vlan: 1

Clear Vlan: 2

-> del vlan

-> get vlan

Ethernet Port Native Vlan: 1

AP's local Vlan: 1

AES Vlan: 1

WEP Vlan: 1

Clear Vlan: INVALID (traffic will be filtered)

In this embodiment, the "get encryption" command requests that the AP indicate whether encryption is enabled. In this case, as shown by the system response, encryption is enabled. The "get vlan" command displays the VLAN security levels for specified VLANs. In this case, all Ethernet, AP local, AES, and WEP security levels have been assigned VLAN 1, whereas the Clear security level has been assigned to VLAN 0xff.

In accordance with one feature of the invention, settings can be adjusted by using a "set vlan" command to modify VLAN security for a specified VLAN. For example, the "set vlan aes 3" and "set vlan eth 3" commands can allow AES and Ethernet traffic on a new VLAN, i.e. VLAN 3. Similarly, a "set vlan ap 3" command may be used to allow the configuration and management functions on the AP to be accessed on VLAN 3. The "set vlan wep 1" command explicitly defines WEP traffic for VLAN 1 (the default VLAN). The "set vlan clear 2" assigns invalid traffic to a new VLAN, i.e. VLAN 2. Note that the "get vlan" command following the "set vlan" commands reflect the newly set VLANs. In one embodiment, a "del vlan" command will delete any previously set VLANs, wherein after the "get vlan" command, the system can respond with the default VLANs of the AP.

In one embodiment, frames arriving untagged, i.e. without a VLAN tag, on an Ethernet port can be assigned a default VID for that port (PVID). The AP can also be designated as belonging to the default VID. Note that frames belonging to the port's default VLAN are transmitted untagged onto the port.

Providing security VLANs advantageously allows users to deploy new cryptographic standards while still supporting the old standards. With different standards available, companies can provide different access to different users, thereby isolating secure traffic from insecure traffic. Security VLANs can also provide users with different levels of authorization, e.g. access control, thereby enhancing system flexibility.

Although illustrative embodiments of the invention have been described in detail herein with reference to the accompanying figures, it is to be understood that the invention is not limited to those precise embodiments. They are not intended to be exhaustive or to limit the invention to the precise forms disclosed. As such, many modifications and variations will be apparent. For example, users can refer to hosts, bridges, routers, and/or computers. Moreover, security levels can refer to domains, strength, speed of performance, and/or levels of authorization (i.e. access control). Finally, access points can refer to any access devices. Accordingly, it is intended that the scope of the invention be defined by the following Claims and their equivalents.

The invention claimed is:

1. A method of configuring an access device to include multiple virtual LANS (VLANs) based on security levels, the method comprising:
   enabling encryption in the access device;
   selectively assigning one of a predetermined security level, multiple security levels, and no security level to each VLAN; and
   setting a security association for each station associated with the access device, wherein the security association of a station determines its assigned VLAN.

2. The method of claim 1, further including setting a multicast key for each security level before enabling encryption.

3. The method of claim 1, further including enabling access control before setting the security association for each station.

4. The method of claim 3, wherein enabling access control includes filtering unencrypted communication from any station.

5. The method of claim 1, wherein setting a security association includes setting key maps for stations associated with the access device.

6. The method of claim 1, wherein selectively assigning includes designating a VLAN identification (VID) for each VLAN.

7. The method of claim 1, wherein selectively assigning includes allowing certain functions on the access device to be accessible via a designated VLAN.

8. The method of claim 1, wherein selectively assigning includes filtering untagged traffic received on a network port on the access device.

9. The method of claim 1, further including reassigning a new security level to at least one VLAN.

10. The method of claim 1, wherein selectively assigning includes accessing a default VLAN configuration based on encryption mode.

11. The method of claim 10, wherein the default VLAN configuration includes:
    assigning security levels with encryption to a default VLAN; and
    assigning security levels without encryption to an invalid VLAN.

12. The method of claim 1, further including:
    deleting any previously-set VLANs; and
    reverting to any default VLANs.

13. A method of isolating more secure traffic from less secure traffic in a wireless communication system, the method comprising:
    building an association between multiple virtual LANS (VLANs) and security levels, wherein a first VLAN having a first security level facilitates the more secure traffic and a second VLAN having a second security level facilitates the less secure traffic, wherein each security level is selectable between a single security level, multiple security levels, and no security level.

14. The method of claim 13, wherein the multiple security levels include at least two of AES, WEP, and unencrypted.

15. The method of claim 13, wherein building includes configuring an access device.

16. The method of claim 15, wherein configuring includes:
    assigning a security level to each VLAN; and
    setting a security association for each station associated with the access device, wherein the security association of a station determines its assigned VLAN.

17. A wireless communication system comprising:
    an access device; and
    a plurality of stations associated with the access device, each station being assigned to a virtual LAN (VLAN) based on a security level associated with that station, each security level being user-selectable between a single security level, multiple security levels, and no security level.

* * * * *